(12) United States Patent
Jiang

(10) Patent No.: US 12,511,030 B1
(45) Date of Patent: Dec. 30, 2025

(54) COMPUTER VISION PROCESS PROCESSING METHOD AND COMPUTER VISION PROCESS PROCESSING SYSTEM

(71) Applicant: IsCoolLab Co., Ltd., Taipei (TW)

(72) Inventor: Yan-Mei Jiang, Taipei (TW)

(73) Assignee: IsCoolLab Co., Ltd., Taipei (TW)

( * ) Notice: Subject to any disclaimer, the term of this patent is extended or adjusted under 35 U.S.C. 154(b) by 0 days.

(21) Appl. No.: 18/963,637

(22) Filed: Nov. 28, 2024

(30) Foreign Application Priority Data

Jun. 28, 2024 (TW) ................................ 113124183

(51) Int. Cl.
  G09G 5/00 (2006.01)
  G06F 3/0487 (2013.01)
  G06T 11/00 (2006.01)

(52) U.S. Cl.
  CPC ............ G06F 3/0487 (2013.01); G06T 11/00 (2013.01)

(58) Field of Classification Search
  CPC .. G06F 3/03547; G06F 3/041; G06F 3/04817; G06F 3/0482; G06F 3/04842; G06F 3/0487; G06F 3/0488; G06F 3/04886; G09G 5/00
  See application file for complete search history.

(56) References Cited

U.S. PATENT DOCUMENTS

| | | | |
|---|---|---|---|
| 10,911,546 B1* | 2/2021 | Goswami | H04L 67/141 |
| 11,250,201 B2* | 2/2022 | Gray | G06F 40/106 |
| 11,704,625 B2* | 7/2023 | Jiang | G06F 8/20 717/101 |
| 11,748,053 B2* | 9/2023 | Jiang | G06F 3/1454 345/2.2 |
| 12,182,557 B2* | 12/2024 | Pachpande | G06F 40/143 |
| 12,198,071 B2* | 1/2025 | Gubbi Lakshminarasimha | G06N 5/04 |
| 2015/0346911 A1* | 12/2015 | Christiansson | G06F 3/0428 345/175 |
| 2021/0342216 A1* | 11/2021 | Dines | G06F 11/0706 |
| 2024/0114624 A1* | 4/2024 | Jiang | H05K 3/225 |
| 2025/0147652 A1* | 5/2025 | Braley | G06F 3/013 |

FOREIGN PATENT DOCUMENTS

TW 202236037 A 9/2022

\* cited by examiner

*Primary Examiner* — Joe H Cheng
(74) *Attorney, Agent, or Firm* — Li & Cai Intellectual Property (USA) Office

(57) ABSTRACT

A computer vision process processing method and a computer vision process processing system are provided. The computer vision process processing method includes: obtaining a first image; and correspondingly determining one or more computer vision process events according to the first image and one or more computer vision automation steps. The one or more computer vision automation steps are each completed by using one or more computer vision automation step simulation components.

9 Claims, 4 Drawing Sheets

COMPUTER VISION PROCESS PROCESSING METHOD AND COMPUTER VISION PROCESS PROCESSING SYSTEM

CROSS-REFERENCE TO RELATED PATENT APPLICATION

This application claims the benefit of priority to Taiwan Patent Application No. 113124183, filed on Jun. 28, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a computer vision process processing method and a computer vision process processing system, and more particularly to a computer vision process processing method and a computer vision process processing system that are cost-effective.

BACKGROUND OF THE DISCLOSURE

Utilizing automated processes to improve work efficiency is currently an important requirement for most manufacturers. However, building automated processes requires a lot of research and development costs and time costs, which cannot meet the time and cost requirements of users. Currently, automated processes in which computer vision is used to complete surveillance tasks are not widely available.

Therefore, a computer vision process processing method and a computer vision process processing system have become an important topic in the industry.

SUMMARY OF THE DISCLOSURE

In response to the above-referenced technical inadequacies, the present disclosure provides a computer vision process processing method and a computer vision process processing system.

In order to solve the above-mentioned problems, one of the technical aspects adopted by the present disclosure is to provide a computer vision process processing method. The computer vision process processing method includes obtaining a first image; and correspondingly determining one or more computer vision process events according to the first image and one or more computer vision automation steps. The one or more computer vision automation steps are each completed by using one or more computer vision automation step simulation components.

In order to solve the above-mentioned problems, another one of the technical aspects adopted by the present disclosure is to provide a computer vision process processing system. The computer vision process processing system includes a control circuit and a storage circuit. The storage circuit includes a computer vision process processing program. The computer vision processing program obtains a first image through the control circuit. The control circuit correspondingly determines one or more computer vision process events according to the first image and one or more computer vision automation steps. The one or more computer vision automation steps are each completed by using one or more computer vision automation step simulation components.

Therefore, the computer vision process processing method and the computer vision process processing system provided by the present disclosure can quickly and effectively use an image to assist users in completing simulation and editing of various types of computer vision automation steps (which are complicated and require a lot of time and energy). Various user operation processes can be accurately executed, so as to effectively save labor costs and time costs. In addition, construction costs and development time for the computer vision automation steps can be significantly saved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
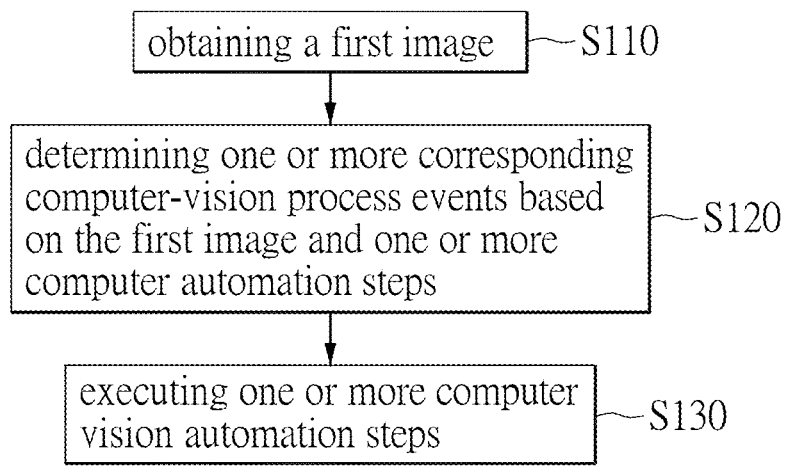
FIG. 1 is a flowchart of a computer vision process processing method according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1, FIG. 1 is a flowchart of a computer vision process processing method according to a first embodiment of the present disclosure.

In this embodiment, a computer vision process processing method is provided. The computer vision process processing method includes the following steps.

Step S110: obtaining a first image.

Step S120: determining one or more computer vision process events based on the first image and one or more computer automation steps.

Step S130: executing the one or more computer vision automation steps.

In step S110, the first image (such as an image obtained by a first computer vision automation step AFL1) is firstly obtained. The first image can be obtained through different channels, such as a camera, a monitor, an image capture module of a mobile phone or a tablet, or a screen image acquisition circuit on a computer device.

Next, in step S120, a first image M1 is connected to one or more computer vision automation step simulation components SB1 to SBN. One or more computer vision automation steps AFL1 to AFLN are respectively completed by using the one or more computer vision automation step simulation components SB1 to SBN. In this embodiment, one or more computer vision process events can be achieved by capturing an operation trajectory of a specific action performed by a user, or by connecting the corresponding computer vision automation steps AFL1 to AFLN.

The corresponding computer vision automation steps AFL1 to AFLN are determined by using the one or more computer vision automation step simulation components SB1 to SBN.

After the corresponding computer vision automation steps AFL1 to AFLN are obtained, the corresponding computer vision automation steps AFL1 to AFLN are executed to confirm whether or not a result is the same as a recorded or captured operation process of the user.

Through a computer vision recognition program, the one or more computer vision automation step simulation components SB1 to SBN execute a mouse click operation process, a keyboard operation process, or multiple automated operation processes of an electronic device (not shown in the drawings). The multiple automated operation processes are to execute a piece of software by a mouse or a keyboard. The computer vision automation step simulation components SB1 to SBN can be adjusted according to actual requirements, and not limited in the present disclosure. Furthermore, the computer vision automation step simulation components SB1-SBN include an automatic input component, a mouse moving component, a plurality of mouse clicking components, a plurality of keyboard signal providing components, or a software clicking component.

That is, the computer vision process processing method in this embodiment simulates various operating processes of the user when operating the electronic device (not shown). In this embodiment, corresponding simulation contents are performed by recording or learning the various operating processes of the user when operating the electronic device (not shown). In this embodiment, the automated operation processes are operated through a plurality of peripheral devices, a plurality of software, a plurality of firmware, or a plurality of hardware already installed in the electronic device (not shown) without changing the software connections or program code connections of the electronic device (not shown). The peripheral devices connected to the electronic device (not shown) include the mouse or the keyboard. The peripheral devices may also include a stylus, a drawing tablet, or a wearable electronic device.

In this embodiment, without changing software and hardware environments (which include software settings or the program code connections) of an electronic device ED1, the computer vision automation steps AFL1 to AFLN are performed through the peripheral devices, the plurality of software, the plurality of firmware, or the plurality of hardware that are set up in the electronic device ED1. Various operation processes of the computer vision automation steps AFL1-AFLN refer to operating various pieces of engineering software or communication software, making network queries, or filling out forms on the electronic device ED1 from a perspective of the user. That is, in this embodiment, the computer vision automation steps AFL1-AFLN simulate processes of multiple users modifying files or operating the electronic device ED1 through the computer vision recognition program.

In other embodiments, the user can directly use the one or more computer vision automation step simulation components SB1 to SBN to edit simple computer vision process events.

Second Embodiment

Figure 2:
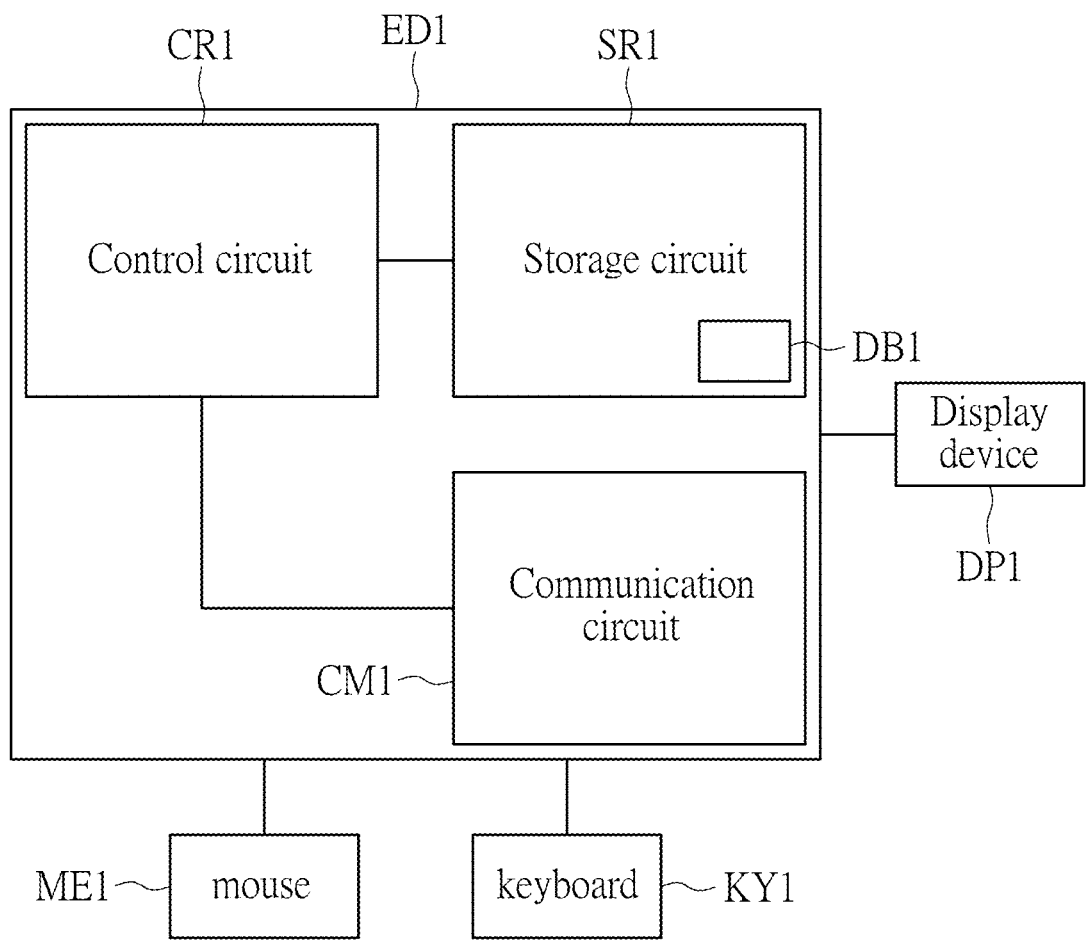
FIG. 2 is a schematic view of a computer vision process processing system according to a second embodiment of the present disclosure.
Figure 3:
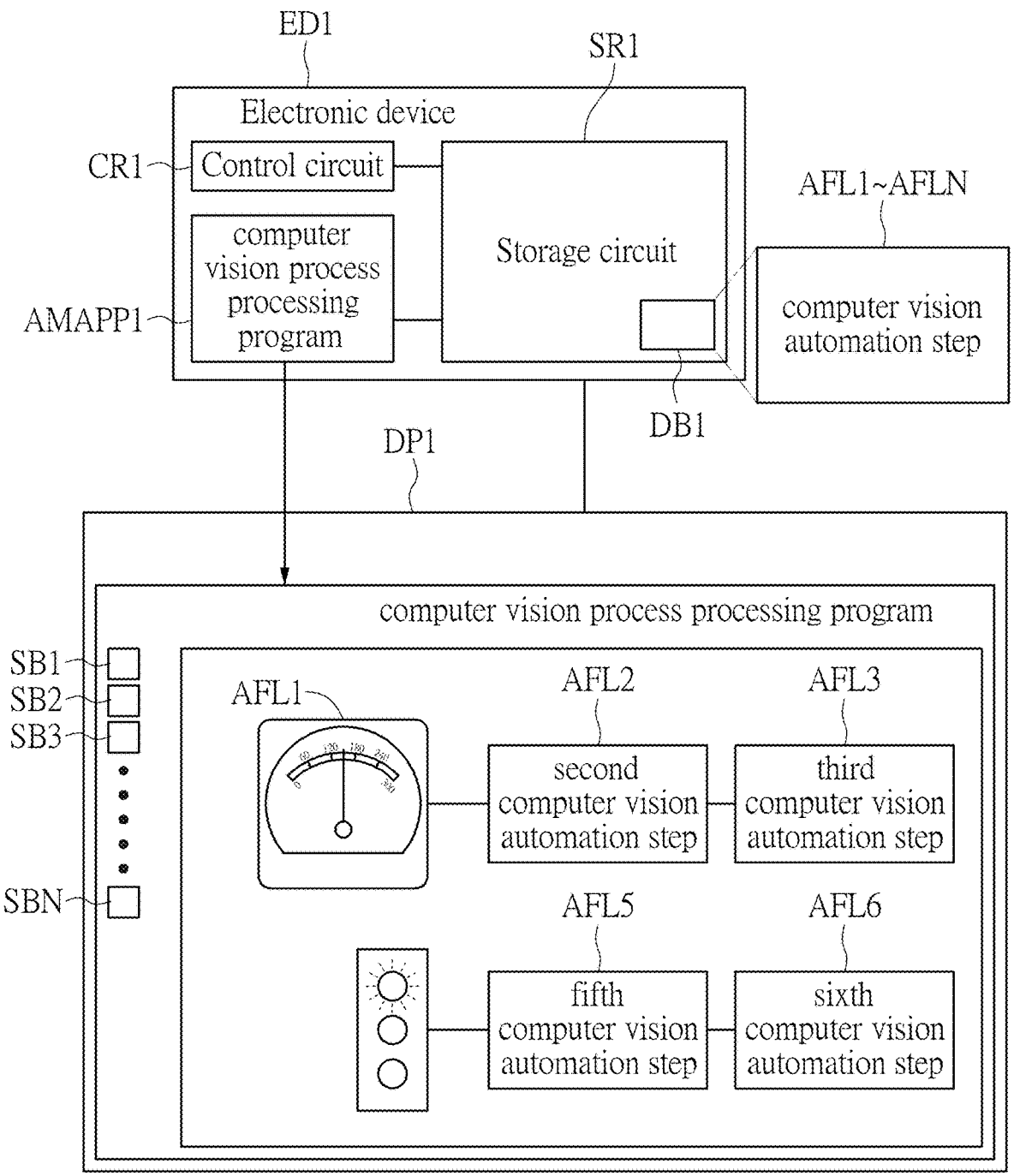
FIG. 3 is another schematic view of the computer vision process processing system according to the second embodiment of the present disclosure.
Figure 4:
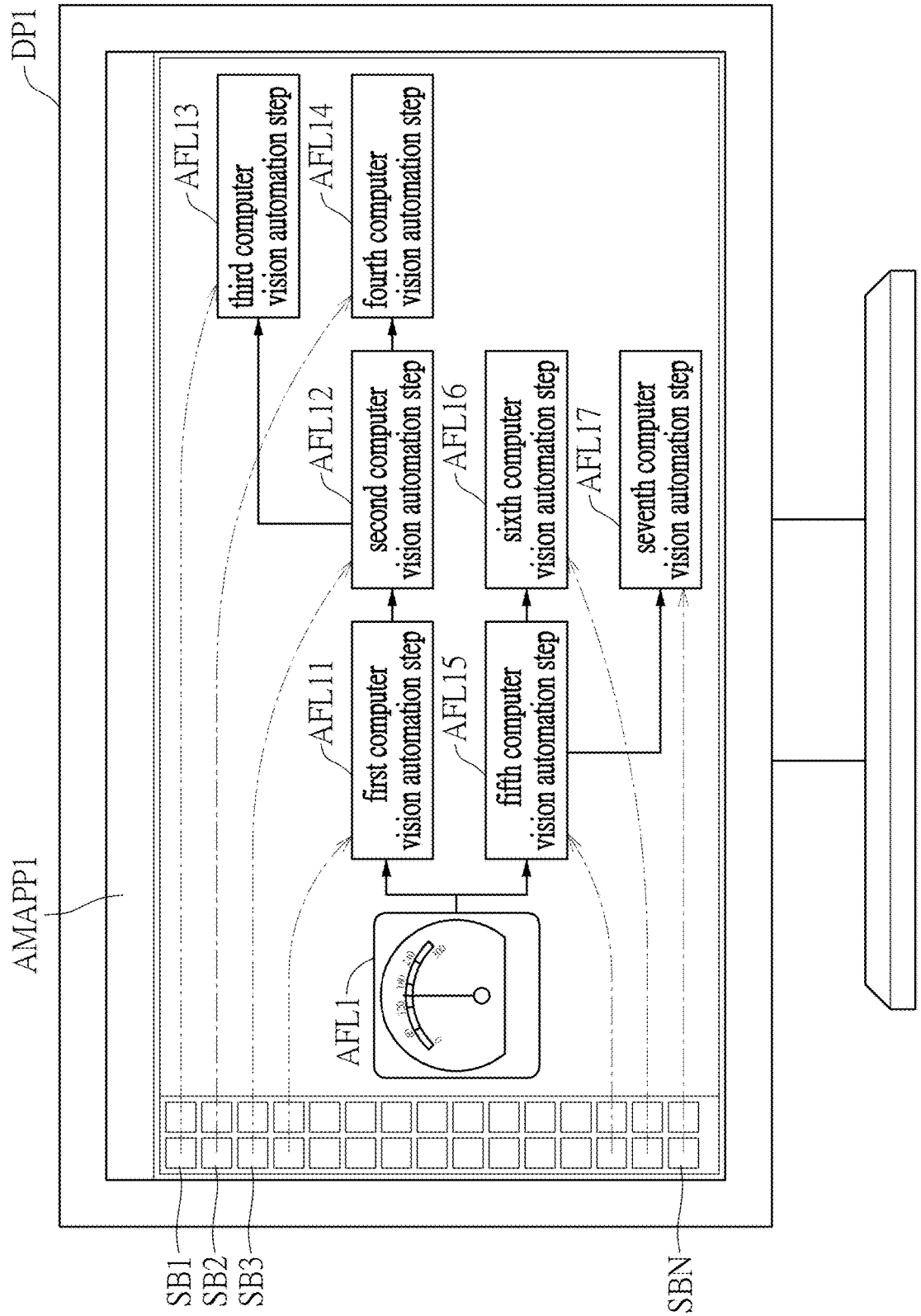
FIG. 4 is a schematic view showing the computer vision process processing system building up a plurality of automated operation processes that correspond to operation trajectories according to the second embodiment of the present disclosure.

Referring to FIG. 2, FIG. 3, and FIG. 4, FIG. 2 is a schematic view of a computer vision process processing system according to a second embodiment of the present disclosure, FIG. 3 is another schematic view of a computer vision process processing system according to the second embodiment of the present disclosure, and FIG. 4 is a schematic view for building up a plurality of automation operation corresponding to operation trajectory of the computer vision process processing system according to the second embodiment of the present disclosure.

In this embodiment, a computer vision process processing system SYS1 is provided. The computer vision process processing system SYS1 at least includes an electronic device ED1. The electronic device ED1 includes a control circuit CR1, a storage circuit SR1, and a communication circuit CM1. The electronic device ED1 is connected to a mouse ME1 and a keyboard KY1. The electronic device ED1 is also connected to a display device DP1.

The storage circuit SR1 of the electronic device ED1 is provided with a computer vision process processing program AMAPP1. The storage circuit SR1 of the electronic device ED1 also includes a database DB1. The database DB1 includes multiple computer vision automation steps AFL1-AFLN.

Each computer vision automation step does not need to be operated by any user, but is processed by the computer vision process processing program AMAPP1 provided in the electronic device ED1. The storage circuit SR1 is provided with the computer vision process processing program AMAPP1. The computer vision process processing program AMAPP1 can edit multiple automated operation processes through a computer vision recognition program. Referring to link contents of the computer vision automation steps AFL1 to AFL6 in FIG. 3, when a pointer change (the first computer vision automation AFL1) or a light signal change (the fourth computer vision automation step AFL4) is detected, the computer vision automation steps AFL2-AFL3 and the computer vision automation steps AFL5-AFL6 will be performed, respectively.

Through the control circuit CR1, the computer vision process processing program AMAPP1 determines each of the computer vision automation steps AFL11-AFL17 by using one or more computer vision automation step simulation components SB1 to SBN (such as the first computer vision automation step simulation component SB1). The control circuit CR1 is used to execute the computer vision automation steps AFL11 to AFL17. The first computer vision automation step AFL11, the second computer vision automation step AFL12, the third computer vision automation step AFL13, the fourth computer vision automation step AFL14, the fifth computer vision automation step AFL15, the sixth computer vision automation step AFL16, and the seventh computer vision automation step AFL17 can each be achieved through one of the computer vision automation step simulation components SB1-SBN, and stored in the storage circuit SR1. The first computer vision automation step AFL11, the second computer vision automation step AFL12, the third computer vision automation step AFL13, the fourth computer vision automation step AFL14, the fifth computer vision automation step AFL15, the sixth computer vision automation step AFL16, and the seventh computer vision automation step AFL17 can also be achieved through a same one of the computer vision automation step simulation components SB1 to SBN.

Through the computer vision recognition program, the one or more computer vision automation step simulation components SB1 to SBN execute a mouse click operation process, a keyboard operation process, or the automated operation process of the electronic device ED1. The automated operation process is to execute a piece of software by a mouse or a keyboard. In this embodiment, the computer vision recognition program is included in the computer vision process processing program AMAPP1. The computer vision process processing program AMAPP1 uses the computer vision recognition program to complete various computer vision automation steps AFL11 to AFL17. In addition, the computer vision process processing program AMAPP1 can also be set up in a server (not shown in the drawings). After the computer vision automation steps AFL11 to AFL17 are created, the computer vision automation steps AFL11 to AFL17 are stored in one database (not shown) for allowing multiple clients to download.

The computer vision automation step simulation components SB1-SBN include an automatic input component, a mouse moving component, or multiple keyboard signal providing components.

By using the computer vision recognition program, the computer vision process processing program AMAPP1 can simulate and edit the corresponding computer vision automation steps AFL1 to AFLN through an operation process in which the user operates the electronic device ED1, an operation process in which the user operates the mouse ME1, an operation process in which the user operates the keyboard KY1, an operation process in which the user operates a touch panel (not shown), an operation process in which the user uses communication software for communication, or an operation process in which the user uses different ones of engineering software and commercial software. Furthermore, the computer vision process processing program AMAPP1 stores the edited computer vision automation steps AFL1 to AFLN in the storage circuit SR1.

In this embodiment, without changing software and hardware environments (which include software settings or program code connections) of the electronic device ED1, the computer vision automation steps AFL11 to AFL17 are operated based on a plurality of peripheral devices, multiple pieces of software, multiple pieces of firmware, or multiple pieces of hardware that have been installed in the electronic device ED1. The various operation processes of the computer vision automation steps AFL11 to AFL17 refer to operating various pieces of engineering software or communication software, making a network query, or filling out forms on the electronic device ED1 from a perspective of the user. That is, in this embodiment, the computer vision automation steps AFL11 to AFL17 simulate processes of multiple users modifying files and operating the electronic device ED1 through the computer vision recognition program. In addition, in this embodiment, the computer vision automation steps AFL11 to AFL17 are multiple processes based on a first image M1. That is, the computer vision process processing system SYS1 in this embodiment is not only capable of implementing single-line programs, but can accurately complete various computer vision process events based on conditional judgments.

In addition, the computer vision process processing system of this embodiment can be used to simulate and edit an operation process that requires the user to repeat a large number of the same actions, and can also be used to simulate and edit user actions of detecting various types of equipment for a long time. The computer vision process processing system can simulate and edit how users create and select components or objects in the engineering software, or can also execute a corresponding operation process according to an instruction file.

BENEFICIAL EFFECTS OF THE EMBODIMENTS

In conclusion, the computer vision process processing method and the computer vision process processing system provided by the present disclosure can quickly and effectively use an image to assist users in completing simulation and editing of various types of computer vision automation steps (which are complicated and require a lot of time and energy). Various user operation processes can be accurately executed, so as to effectively save labor costs and time costs. In addition, construction costs and development time for the computer vision automation steps can be significantly saved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A computer vision process processing system, comprising:
　　a control circuit; and
　　a storage circuit, wherein the storage circuit includes a computer vision processing program;
　　wherein the computer vision processing program obtains a first image through the control circuit;
　　wherein the control circuit correspondingly determines one or more computer vision process events according to the first image and one or more computer vision automation steps;
　　wherein the one or more computer vision automation steps are each completed by using one or more computer vision automation step simulation components.

2. The computer vision process processing system according to claim 1, wherein the control circuit assists in correspondingly executing the one or more computer vision process events, and the computer vision process events are stored in the storage circuit.

3. The computer vision process processing system according to claim 2, wherein a plurality of automated operation processes of the one or more computer vision process event are executed through a computer vision recognition program, a mouse clicking operation process, a keyboard operation process, or a software of the computer vision process event that executes through a computer vision recognition program by a mouse or a keyboard.

4. The computer vision process processing system according to claim 3, wherein the computer vision automation step simulation components include an automatic input component, a mouse moving component, or a plurality of keyboard signal providing components; wherein, without changing software connections or program code connections of the electronic device, the computer vision process events are executed based on a plurality of peripheral devices, multiple pieces of software, multiple pieces of firmware, or multiple pieces of hardware that are installed in the electronic device; wherein the peripheral devices include the mouse or the keyboard.

5. A computer vision process processing method, comprising:
　　obtaining a first image; and
　　correspondingly determining one or more computer vision process events according to the first image and one or more computer vision automation steps;
　　wherein the one or more computer vision automation steps are each completed by using one or more computer vision automation step simulation components.

6. The computer vision process processing method according to claim 5, further comprising: executing the one or more computer vision automation steps.

7. The computer vision process processing method according to claim 6, wherein, through a computer vision recognition program, the one or more computer vision automation step simulation components execute a mouse click operation process, a keyboard operation process, or the computer vision process event of an electronic device; wherein the computer vision process event is to execute a piece of software by a mouse or a keyboard.

8. The computer vision process processing method according to claim 7, wherein the computer vision automation step simulation components include an automatic input component, a mouse moving component, a plurality of mouse clicking components, a plurality of keyboard signal providing components, or a software clicking component.

9. The computer vision process processing method according to claim 8, wherein, without changing software connections or program code connections of the electronic device, the computer vision process events are executed based on a plurality of peripheral devices, multiple pieces of software, multiple pieces of firmware, or multiple pieces of hardware that are installed in the electronic device; wherein the peripheral devices include the mouse or the keyboard.

\* \* \* \* \*